3,535,395
CATALYTIC PROCESS FOR THE ISOMERIZATION
OF 5-VINYLBICYCLO[2.2.1]HEPT-2-ENES
Wolfgang Schneider, Brecksville, Ohio, assignor to The
B. F. Goodrich Company, New York, N.Y., a corporation of New York
No Drawing. Filed Apr. 7, 1969, Ser. No. 814,149
Int. Cl. C07c 5/28
U.S. Cl. 260—666                 16 Claims

ABSTRACT OF THE DISCLOSURE 5-vinylbicyclo[2.2.1]hept-2-enes heated in the presence of a titanium catalyst system are isomerized to 5-ethylidenebicyclo[2.2.1]hept-2-enes. The catalyst system of this invention consists of a titanium tetrahalide or titanium alcoholate and an organometallic compound or lithium aluminum hydride. The catalyst system is highly efficient and capable of rapidly isomerizing 5-vinylbicyclo [2.2.1]hept-2-enes. 5-ethylidenebicyclo[2.2.1]hept-2-enes are useful comonomers for polymerization with α-olefins such as ethylene and propylene.

BACKGROUND OF THE INVENTION

Previously known catalysts for the isomerization of 5-vinylbicyclo[2.2.1]hept-2-ene to 5-ethylidenebicyclo [2.2.1]hept-2-ene have not been completely satisfactory. Large amounts of catalysts were necessary to achieve acceptable rates of isomerization, thereby producing significant amounts of polymeric residues in addition to the poor catalyst efficiency.

SUMMARY OF THE INVENTION

I have now found quite unexpectedly an improved catalytic process for the isomerization of 5-vinylbicyclo [2.2.1]hept-2-enes to 5 - ethylidenebicyclo[2.2.1]hept-2-enes wherein high catalyst efficiencies are achieved. Rapid isomerization rates are realized with the process of the present invention. The increased rate of isomerization and excellent catalyst efficiencies obtained with the present catalysts are significant since it is now possible to achieve isomerization in very short periods of time employing very low catalyst concentrations. In this manner polymeric by-products formed during the isomerization are minimized and in most instances completely eliminated. The present process utilizes a titanium catalyst comprising a titanium tetrahalide or alcoholate and an organometallic compound of Group I–A, II–A, III–A or the Lanthanide Group or lithium aluminum hydride. The isomerization reaction of this invention may be represented as follows:

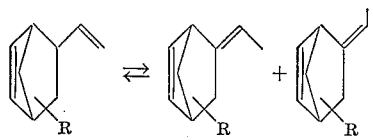

wherein R is a hydrogen or alkyl group containing from 1 to 4 carbon atoms. The process is particularly useful to obtain 5-ethylidenebicyclo[2.2.1]hept-2-ene (R=H) which is a useful monomer for copolymerization with olefins such as ethylene and propylene.

DETAILED DESCRIPTION 5-vinylbicyclo[2.2.1]hept-2-enes employed in the present isomerization process correspond to the structural formula:

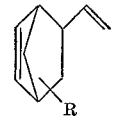

wherein R is a hydrogen or an alkyl group containing from 1 to 4 carbon atoms. The present process is particularly advantageous for the isomerization of 5-vinylbicyclo[2.2.1]hept-2-ene (where R=H) since this material is readily available from the Diels-Alder addition of 1,3-cyclopentadiene and 1,3-butadiene. Other 5-vinylbicyclo[2.2.1]hept-2-enes, such as methyl-5-vinylbicyclo [2.2.1]hept-2-enes obtained from the reaction of 1,3-cyclopentadiene with piperylene or methyl 1,3-cyclopentadiene and butadiene, are just as effectively isomerized by the present process.

The catalyst system employed in the present process comprises a titanium compound and an organometallic compound of a Group I–A, II–A, III–A or Lanthanide Group metal or lithium aluminum hydride. The particular titanium compounds employed are titanium tetrahalides and titanium alcoholates which correspond to the structural formula:

$$Ti(X)_{4-y}(OR)_y$$

wherein X is chlorine, bromine or iodine, R is a hydrocarbon radical containing from 1 to 12 carbon atoms and more preferably 1 to 8 carbon atoms, such as alkyl, cycloalkyl, aryl and alkaryl groups, and y is an integer from 0 to 4. Excellent results are obtained with titanium tetrachloride, titanium tetrabromide, titanium tetraiodide, $C_2H_5OTiCl_3$, $(C_2H_5O)_2TiCl_2$, $(C_2H_5O)_3TiCl$, tetraethyl titanate, tetra-(iso-propyl)titanate, tetra-n-butyl titanate, tetra-(2-ethylhexyl)titanate and tetraphenyl titanate. Mixtures of these titanium compounds may also be employed. For example, mixtures of titanium tetrahalides with tetraalkyl titanates are useful as the titanium component in forming the catalyst of the present process.

Organometallic compounds typically used with the titanium compound to form the catalysts of this invention are organic compounds of metals of Group I–A, II–A, III–A r the Lanthanide Group of the Periodic Table and particularly lithium, magnesium and aluminum. Particularly useful organometallic compounds are alkyl and aryl magnesium haides, wherein the alkyl group contains from 1 to 12 carbon atoms and aryl groups from 6 to 12 carbon atoms; metal alkyls and metal aryls of lithium, magnesium and aluminum wherein the alkyl group contains from 1 to 12 carbon atoms and the aryl groups from 6 to 12 carbon atoms; alkyl aluminum hydrides and fluorides wherein the alkyl group contains from 1 to 12 carbon atoms. Preferably in the above compounds alkyl groups will contain from 1 to 8 carbon atoms and aryl groups from 6 to 9 carbon atoms. Excellent results are obtained when the organometalilc compound employed with the titanium compound is ethylmagnesium bromide, ethylmagnesium chloride, methylmagnesium iodide, butylmagnesium chloride, phenylmagnesium bromide, benzylmagnesium chloride, methyllithium, iso-butyllithium, diethylmagnesium, diphenylmagnesium, triethylaluminum, tripropylaluminum, tri-iso-butylaluminum, tri-n-octylaluminum, diethylaluminum hydride, dibutylaluminum hydride, diethylaluminum fluoride, diisobutylaluminum fluoride, and the like. Excellent results have also been obtained when lithium aluminum hydride is employed with the titanium compound.

The present catalyst systems are obtained by contacting the titanium compound with the organometallic compound or lithium aluminum hydride. The catalyst may be prepared prior to use or the individual catalyst components may be mixed in the reactor in the presence of the 5-vinylbicyclo[2.2.1]hept-2-ene. If the catalyst system is prepared prior to the isomerization the titanium compound and the organometallic compound or lithium aluminum hydride are generally admixed in an inert solvent. This latter method facilitates subsequent storage, handling and charging of the catalyst and is a useful means to control the reaction exotherm.

While large amounts of the titanium compound may be employed, the concentration will generally range from about 10 millimols per mol 5-vinylbicyclo[2.2.1]hept-2-ene to about 0.001 millimol per mol 5-vinylbicyclo[2.2.1]hept-2-ene. Up to about 20 millimols, or more, of the titanium compounds per mol 5-vinylbicyclo[2.2.1]hept-2-ene can be employed if desired. Excellent results have been obtained when the concentration of the titanium compound is between about 5 millimols and 0.01 per mol 5-vinylbicyclo[2.2.1]hept-2-ene. About 2 to 10 mol equivalents and more preferably 2.25 to 5 mol equivalents, of the organometallic compound or lithium aluminum hydride will be employed per mol equivalent of the titanium compound. It is often advantageous to employ sufficient excess of the organometallic compound or lithium aluminum hydride so that it will also serve as a scavenger to remove impurities such as oxygen, alcohols, water and the like present in the system.

The isomerization is carried out by heating the 5-vinylbicyclo[2.2.1]hept-2-ene in the presence of the titanium catalyst system. The 5-vinylbicyclo[2.2.1]hept-2-ene is generally charged to the reactor and the pre-formed catalyst or the individual catalyst components added thereto. The catalyst or individual catalyst components may be completely charged at the outset of the isomerization or charged continuously as the isomerization progresses. The process may be conducted employing either batch or continuous techniques. Prior to the introduction of the pre-formed catalyst or the titanium compound if the catalyst is to be prepared in situ, an amount of organometallic compound may be charged to the reactor to remove small amounts of undesirable impurities present in the system. The 5-ethylidenebicyclo[2.2.1]hept-2-enes can be recovered by fractional distillation or it may be removed continuously throughout the run if continuous operation is employed.

The isomerization may be conducted in an inert diluent such as the aromatic or saturated aliphatic hydrocarbons. High-boiling saturated hydrocarbons have been employed since they do not interfere with the recovery of the 5-ethylidenebicyclo[2.2.1])hept-2-ene and also permit operation of the process within the desired temperature range without the use of pressure vessels. Useful hydrocarbon solvents include pentane, isopentane, 2,2-dimethylpentane, 2,4-dimethylpentane, 2,3 - dimethylpentane, 3-ethylpentane, n-hexane, isohexane, 3-methylhexane, n-heptane, n-octane, isoctane, cyclohexane, benzene, toluene, the xylenes, mesitylene and the like or mixtures thereof. If a diluent is employed the ratio of the diluent to 5-vinylbicyclo[2.2.1]hept-2-ene will generally range between about 1:10 and about 10:1.

It is not essential that the 5-vinylbicyclo[2.2.1]hept-2-ene be absolutely pure, however, the presence of large amounts of impurities should be avoided for best results. Small amounts of impurities such as water, alcohols, peroxides and air present in the 5-vinylbicyclo[2.2.1]hept-2-ene or diluent can be tolerated, however, it is preferred they be removed by the addition of a scavenging agent, which in this case can also serve as the modifier, or by some other suitable means. Distillation or sieving of the 5-vinylbicyclo[2.2.1]hept-2-ene and diluent prior to use will generally suffice to remove most impurities which seriously impair the catalyst efficiency or promote formation of polymeric materials.

The isomerization process is typically conducted under a dry atmosphere of an inert gas such as nitrogen or argon and may be conducted at atmospheric, sub-atmospheric or super-atmospheric pressure depending on the reaction conditions and diluent employed.

The isomerization process is typically conducted at temperatures above 40° C. and up to 300° C. or above. Excellent results, i.e., high catalyst efficiency and a rapid isomerization, generally 90% or more conversion of the 5-vinylbicyclo[2.2.1]hept-2-ene in 5 minutes or less, have been obtained within the temperature range 80 to 225° C. The increased rate of isomerization achieved with the present invention permits the isomerization of 5-vinylbicyclo[2.2.1]hept-2-ene to 5-ethylidenebicyclo[2.2.1]hept-2-ene on a continuous basis. With continuous processes such as those employing tubular reactors and capable of achieving short contact times of the 5-vinylbicyclo[2.2.1]hept-2-ene with the catalyst, temperatures above 250° C. may be desirable. At room temperature the rate of isomerization, although considerably slower than obtained at elevated temperatures, is nevertheless significant and a reasonable degree of conversion can be achieved.

The following examples illustrate the invention more fully, however, they are not intended to limit the scope thereof. All parts and percentages unless indicated otherwise are on a weight basis.

EXAMPLE I 13.5 mls. (0.1 mol) 5-vinylbicyclo[2.2.1]hept-2-ene prepared by the Diels-Alder reaction of 1,3-cyclopentadiene and 1,3-butadiene as described by A. F. Platé and N. A. Belikova in Zhurnal Obshchei Khimii, 30, No. 12, 3945–53 (1960) was charged to a dry argon-purged reactor containing 13.5 mls. mesitylene and 0.17 mls. tetra-(n-butyl) titanate (0.5 millimols) was added at room temperature with stirring while maintaining the argon purge. After charging 0.1 gram lithium aluminum hydride (2.5 millimol) the reactor and its contents were heated to 150° C. under an argon atmosphere. The heating was continued for 30 minutes. The resulting reaction product analyzed by vapor phase chromatography was found to contain 97.5% 5-ethylidenebicyclo[2.2.1]hept-2-ene.

EXAMPLE II

Employing identical molar amounts of reactants as employed in Example I except that the titanium compound employed was titanium tetrachloride, 5-vinylbicyclo[2.2.1]hept-2-ene was isomerized at 150° C. In this run 0.055 ml. (0.5 millimol) of titanium tetrachloride was employed. 82.2% of the 5-vinylbicyclo[2.2.1]hept-2-ene was isomerized to 5-ethylidenebicyclo[2.2.1]hept-2-ene after 30 minutes. Two similar runs made in which 0.15 ml. (1 millimol) titanium tetrabromide and 0.6 gram (1 millimol) titanium tetraiodide were employed as the titanium component gave 91.1% and 90.7% 5-ethylidenebicyclo[2.2.1]hept-2-ene, respectively. In all of the above runs the major portion of the 5-vinylbicyclo[2.2.1]hept-2-ene is isomerized within 5 minutes at 150° C.

EXAMPLE III

Employing the procedure of Example I, a series of runs were made varying the titanium compounds, the organometallic compounds, the ratio of the catalyst components and the reaction temperature. The isomerizations were conducted for 30 minutes after which time the reaction product was analyzed to determine the percent 5- ethylidenebicyclo[2.2.1]hept-2-ene obtained. The results are tabulated in Table I. The table sets forth the catalyst components, the amount of each component employed, and the reaction temperature for the particular run.

In addition to the titanium compounds listed in the table, tetraphenyl titanate was employed as the titanium compound with diisobutylaluminum hydride, similar isomerization of 5-vinylbicyclo[2.2.1]hept-2-ene to 5-ethylidenebicyclo[2.2.1]hept12-ene was observed.

TABLE I

| Run No. | 5-vinylbicyclo-[2.2.1]hept-2-ene, mols | Titanium compound, millimols | Organometallic compound, millimols | Reaction temp., °C. | Percent yield 5-ethylidene bicyclo-[2.2.1]hept-2-ene |
|---|---|---|---|---|---|
| 1 | 0.1 | (i-C$_3$H$_7$O)$_4$Ti (0.5 mm.) | (C$_2$H$_5$)$_2$AlH (2.8 mm.) | 150 | 94.4 |
| 2 | 0.1 | (i-C$_3$H$_7$O)$_4$Ti (0.5 mm.) | n-C$_4$H$_9$Li (2 mm.) | 150 | 91.9 |
| 3 | 0.2 | (n-C$_4$H$_9$O)$_4$Ti (0.5 mm.) | (i-C$_4$H$_9$)$_2$AlH (2.8 mm.) | 150 | 63.8 |
| 4 | 0.2 | (C$_8$H$_{17}$O)$_4$Ti* (0.5 mm.) | (i-C$_4$H$_9$)$_2$AlH (2.8 mm.) | 150 | 66.8 |
| 5 | 0.1 | (n-C$_4$H$_9$O)$_4$Ti (0.5 mm.) | (C$_2$H$_5$)$_2$AlF** (3.5 mm.) | 150 | 97.2 |
| 6 | 0.1 | (n-C$_4$H$_9$O)$_4$Ti (0.5 mm.) | (i-C$_4$H$_9$)$_2$AlH (2.8 mm.) | 120 | 41.4 |

*C$_8$H$_{17}$=2-ethylhexyl.  **50% heptane solution.

EXAMPLE IV 13.5 mls. (0.1 mol) 5-vinylbicyclo[2.2.1]ept-2-ene was charged to a reactor containing 13.5 ml. mesitylene under an argon purge and 0.06 ml. titanium tetrachloride (0.5 millimol) and 0.17 ml. tetra-(n-butyl)titanate (0.5 millimol) added thereto. One-tenth gram (2.5 millimols) lithium aluminum hydride was charged to the reactor and the temperature increased to 150° C. in 30 minutes. The resulting reaction product analyzed by vapor phase chromatography contained 95.6% 5-ethylidenebicyclo-[2.2.1]hept-2-ene.

EXAMPLE V 1- and 2-methyl-5-vinylbicyclo[2.2.1]hept-2-ene obtained by the Diels-Alder addition of methylcyclopentadiene and 1,3-butadiene was isomerized at 150° C. To 0.1 mol of a mixture of 1- and 2-methyl-substituted 5-vinylbicyclo[2.2.1]hept-2-ene in mesitylene was added 0.17 ml. tetra-(n-butyl)titanate (0.5 millimol) and 0.5 ml. triethylaluminum (3.6 millimols) and the reaction mixture heated for 30 minutes at 150° C. after which time 99% methyl-substituted ethylidenebicyclo[2.2.1]-hept-2-ene was obtained. When the reaction was repeated employing the identical catalyst system but obtained by pre-mixing the individual catalyst components in mesitylene prior to charging to the reactor, the same high conversion of 5-vinylbicyclo[2.2.1]hept-2-ene to 5-ethylidenebicyclo[2.2.1]hept-2-ene was observed.

EXAMPLE VI 5-ethylidenebicyclo[2.2.1]hept-2-ene was polymerized in solution with ethylene and propylene. To 500 mls. hexane maintained at −10° C. and saturated with a gas mixture (30 mol percent ethylene/70 mol percent propylene) was added 0.813 gram 5-ethylidenebicyclo[2.2.1]-hept-2-ene and a reduced vanadium catalyst system (Al/V mol ratio=167). Throughout the polymerization the gas mixture (30/70) was continuously fed into the polymerizer with continuous agitation so that a concentration of about 30 mol percent ethylene was in the gas phase above the liquid. The polymerization was allowed to run for approximately 15 minutes. Approximately 4½ grams terpolymer was obtained upon precipitation with alcohol. The polymer contained about 33% by weight propylene and about 10% by weight 5-ethylidenebicyclo[2.2.1]hept-2-ene. Compounded polymers of this type are useful in the manufacture of tire carcass. Compounded with about 80 parts black, 40 parts oil, 0.8 part TMTD, 0.4 part MBTS and 1.25 parts sulfur and cured at 320° F., tensiles of about 3000 p.s.i. with about 250% elongation are typically realized.

I claim:

1. A process for the isomerization of 5-vinylbicyclo-[2.2.1]hept-2-enes to 5-ethylidenebicyclo[2.2.1]hept-2-enes which comprises contacting a 5-vinylbicyclo[2.2.1]hept-2-ene of the formula

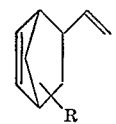

where R is a hydrogen or an alkyl group containing from 1 to 4 carbon atoms with a catalyst formed by mixing (1) a titanium compound of the formula:

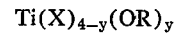

wherein X is chlorine, bromine or iodine, R is a hydrocarbon radical containing from 1 to 12 carbon atoms, and y is an integer from 0 to 4, or mixture thereof, and (2) a compound selected from the group consisting of lithium aluminum hydride, alkyl magnesium halides wherein the alkyl group contains from 1 to 12 carbon atoms, aryl magnesium halides wherein the aryl group contains from 6 to 12 carbon atoms, metal alkyls and metal aryls wherein the metal is lithium, magnesium or aluminum, the alkyl group contains from 1 to 12 carbon atoms and the aryl group contains from 6 to 12 carbon atoms, and alkyl aluminum hydrides and alkyl aluminum fluorides wherein the alkyl group contains from 1 to 12 carbon atoms.

2. The process of claim 1 wherein the isomerization is conducted at a temperature between about 40° C. and 300° C. with about 2 to 10 mol equivalents of (2) per mol equivalent of (1).

3. The process of claim 2 wherein the 5-vinylbicyclo-[2.2.1]hept-2-ene is 5-vinylbicyclo[2.2.1]hept-2-ene.

4. The process of claim 3 wherein (2) is a lithium, magnesium or aluminum alkyl, alkyl aluminum hydride or alkyl aluminum fluoride wherein the alkyl group contains from 1 to 8 carbon atoms; a lithium, magnesium or aluminum aryl, wherein the aryl group contains from 6 to 9 carbon atoms; or lithium aluminum hydride.

5. The process of claim 4 wherein the isomerization is conducted in an inert aromatic or saturated aliphatic hydrocarbon diluent at a temperature between about 80° C. and 225° C.

6. The process of claim 5 with about 20 millimols to 0.001 millimol of (1) per mol 5-vinylbicyclo[2.2.1]hept-2-ene and about 2.25 to 5 mol equivalents of (2) per mol equivalent (1).

7. The process of claim 6 wherein the inert hydrocarbon diluent is mesitylene.

8. The process of claim 6 wherein about 5 millimols to 0.01 millimol (1) per mol 5-vinylbicyclo[2.2.1]hept-2-ene is employed.

9. The process of claim 8 wherein (2) is lithium aluminum hydride.

10. The process of claim 9 wherein (1) is titanium tetrabromide.

11. The process of claim 9 wherein (1) is titanium tetrachloride.

12. The process of claim 9 wherein (1) is a tetraalkyl titanate wherein the alkyl group contains 2 to 4 carbon atoms.

13. The process of claim 8 wherein (2) is diethylaluminum hydride.

14. The process of claim 13 wherein (1) is a tetraalkyl titanate wherein the alkyl group contains 2 to 4 carbon atoms.

15. The process of claim 8 wherein (2) is diethylaluminum fluoride.

16. The process of claim 15 wherein (1) is a tetraalkyl titanate wherein the alkyl group contains 2 to 4 carbon atoms.

References Cited

UNITED STATES PATENTS

| 3,151,173 | 9/1964 | Nyce | 260—666 |
| 3,347,944 | 10/1967 | Fritz et al. | 260—666 |
| 3,472,824 | 10/1969 | Nakaguci et al. | 260—666 |
| 3,211,709 | 10/1965 | Adamek et al. | 260—80.7 |

FOREIGN PATENTS 880,904  11/1957  Great Britain.

V. O'KEEFE, Assistant Examiner

PO-1050
(5/69)

UNITED STATES PATENT OFFICE
CERTIFICATE OF CORRECTION

Patent No. 3,535,395            Dated October 20, 1970

Inventor(s) Wolfgang Schneider

It is certified that error appears in the above-identified patent and that said Letters Patent are hereby corrected as shown below:

Column 2, line 48, "r" should read --or--; line 51, "haides" should read --halides--; line 61, "organometalilc" should read --organometallic--. Column 3, line 2, after "tri-iso-butyl-aluminum" insert --tri-n-hexylaluminum--; line 63, "2,3-dimethylpentane" should read --3,3-dimethylpentane--; line 65, "isoctane" should read --isooctane--. Column 5, line 10, "heptl2-ene" should read --hept-2-ene--; line 23, "ept-2-ene" should read --hept-2-ene--.

SIGNED AND
SEALED
JAN 5 1971

(SEAL)
Attest:

Edward M. Fletcher, Jr.
Attesting Officer

WILLIAM E. SCHUYLER, JR.
Commissioner of Patents